United States Patent [19]

Schrewelius

[11] 4,411,936
[45] Oct. 25, 1983

[54] SPRAYED ALLOY LAYER AND METHOD OF MAKING SAME

[75] Inventor: Nils G. Schrewelius, Hallstahammar, Sweden

[73] Assignee: Bulten-Kanthal AB, Hallstahammar, Sweden

[21] Appl. No.: 199,699

[22] Filed: Oct. 23, 1980

Related U.S. Application Data

[63] Continuation of Ser. No. 54,414, Jul. 3, 1979, abandoned.

[30] Foreign Application Priority Data

Jul. 4, 1978 [SE] Sweden .............................. 7807523

[51] Int. Cl.$^3$ ............................................. B05D 1/08
[52] U.S. Cl. .................................. 427/367; 427/376.2; 427/376.6; 427/383.1; 427/423
[58] Field of Search ................. 427/34, 422, 423, 367, 427/376.6, 376.2, 383.1

[56] References Cited

U.S. PATENT DOCUMENTS

| | | | |
|---|---|---|---|
| 3,640,755 | 2/1972 | Barth | 427/423 |
| 3,947,607 | 3/1976 | Gazzard et al. | 427/423 X |
| 3,961,098 | 6/1976 | Bessen | 427/237 X |
| 4,101,713 | 7/1978 | Hirsch et al. | 427/423 |
| 4,117,179 | 9/1978 | Jackson et al. | 427/34 X |
| 4,161,555 | 7/1979 | Appleman | 427/423 |
| 4,172,155 | 10/1979 | Pease | 427/423 |
| 4,175,611 | 11/1979 | Fletcher | 427/423 |

FOREIGN PATENT DOCUMENTS

| | | | |
|---|---|---|---|
| 2646554 | 4/1978 | Fed. Rep. of Germany | 427/423 |
| 2816283 | 10/1978 | Fed. Rep. of Germany | 427/423 |
| 1172867 | 2/1959 | France . | |

OTHER PUBLICATIONS

Caychetier, Von J., "Korrosion Durch Heisse Gase und Verbrennungsprodukte", Berichti Über Sie Korrosionstugung 1965, Verlag Chemie, pp. 165-166 (1966).

*Primary Examiner*—Shrive P. Beck
*Attorney, Agent, or Firm*—Hill, Van Santen, Steadman & Simpson

[57] ABSTRACT

A metallic layer is applied to a substrate by flame spraying or arc spraying an alloy containing iron, chromium, and aluminum onto a substrate under conditions sufficient to produce a deposited layer containing from 10 to 30% by weight chromium, 1 to 12% by weight aluminum, 0.008 to 0.025% by weight nitrogen, 0.01 to 1.25% by weight oxygen predominantly as oxides of aluminum, iron, and chromium, with the balance substantially iron.

5 Claims, No Drawings

SPRAYED ALLOY LAYER AND METHOD OF MAKING SAME

This is a continuation of application Ser. No. 054,414, filed July 3, 1979, now abandoned.

BACKGROUND OF THE INVENTION

1. Field of the Invention

This invention is in the field of hot spraying metal alloys, particularly in the form of wires to produce a coating which is generally non-porous and contains oxide in the form of particles and films with the thickness not exceeding approximately 2 microns distributed in the alloy layer so that grain growth in the alloy layer is prevented while at the same time the desired diffusion of aluminum atoms from the interior of the layer to the surface is permitted.

2. Description of the Prior Art

Methods of applying metallic layers to substrates by use of flame spraying and the like are already known in the art. Generally, such layers are porous and have large oxide contents which may prevent them from welding together to form non-porous alloy layers.

Alloys of the iron-chromium-aluminum type containing 1 to 12% aluminum and 10 to 30% chromium have long been used as electric resistance elements since they resist oxidation at very high temperatures on the order of 1300° C. and above. Such alloys are manufactured by melt-metallurgical processes in the forms of wires or strips which can be formed into resistor elements.

It has long been desired to be able to produce dense extended layers of such iron-chromium-aluminum alloys, but it has not been proven practical to produce such layers either by melt-metallurgical processes or by powder metallurgical processes. There is a mention in the technical literature (Korrosion 18, Verlag Chemie GmbH, Weinheim/Bergstr., Germany 1966) as to the desirability of protecting steel with a layer of "Kanthal" alloy which is the trademark for an iron-chromium-aluminum cobalt alloy. The layer in the reference has a thickness of about 300 microns.

French Pat. No. 1,172,867 mentions the use of a "Kanthal" alloy among 12 alloys as thin binding layers for oxide coated bodies. However, no further information is given with regard to the composition, structure or the properties of the layers. The composition of the wire to be sprayed according to the French patent is 2% cobalt, 6% aluminum, 23% chromium, and 69% iron, but the composition of the final layer is not defined. The composition of the layer is not predictable because the structure and the analysis of the alloy is subject to considerable changes under the influence of high temperature and other factors which prevail during spraying.

SUMMARY OF THE INVENTION

It has now been found possible to produce non-porous layers having valuable properties by the spraying of wires of a cobalt-free iron-chromium-aluminum alloy. It has been found particularly important for achieving these results to control the amount of oxide and the distribution thereof in the alloys.

Specifically, the present invention provides an improved coated layer and the method of making the same. In accordance with the invention, an iron-chromium-aluminum alloy is flame sprayed or arc sprayed onto a substrate to produce a layer having a thickness of at least 0.3 mm and containing from 10 to 30% by weight chromium, from 1 to 12% by weight aluminum, from 0.008 to 0.025% by weight nitrogen, from 0.01 to 1.25% by weight oxygen predominantly as oxides of aluminum, iron, and chromium, with the balance being substantially iron. Additional benefits are achieved if the original deposited layer is machined to remove at least 0.2 mm of the previous thickness, and the machined alloy is then heat treated for at least one minute at a temperature in the range from 1200° to 1400° C. to sinter the alloy layer, causing oxide films present to shrink together into closed cavities, and also resulting in the densification of the alloy.

DESCRIPTION OF THE PREFERRED EMBODIMENTS

Layers of iron-chromium-aluminum alloy according to the present invention are obtained either by using a flame spray method or an arc spraying method. In flame spraying, a metal wire is fed into a flame spray gun in which a gas, usually acetylene, is burned in the presence of oxygen. To atomize the melted metal particles and to propel them onto a substrate, a gas jet consisting, for example, of air is used.

In arc spraying, two similar metal wires have an electrical arc struck between them. The resulting melted particles are propelled onto the substrate to be coated by means of a gas jet.

It is important regardless of the manner by which the alloy particles are projected to keep the oxidation of the metal particles under close control during spraying. One manner of controlling the oxidation is to use a protective gas such as argon as the atomizing gas. Where arc spraying is used, it is also possible to surround the equipment either entirely or partly with a protective gas by placing it in an enclosed space.

As a result of experimentation leading up to the present invention, it has been established that the oxide content in the sprayed layers of the iron-chromium-aluminum alloy should be kept low. The highest acceptable value for the oxide content depends to some extent on the type of oxide, on the grain size, and also what the acceptable degree of porosity is in the final product. Generally, a volume of 10% oxide may be set as an upper limit but normally a content of less than 5% by volume is required. When arc spraying in argon, it is possible to attain very low oxygen contents such as 0.05% or even lower. If argon is used as an atomizing gas with acetylene and oxygen as the fuel gases, oxygen content values in the region of about 0.1 to 0.5% by volume can be attained.

In the foregoing, some percentages by volume have been used since they are more feasible to measure under the microscope. However, where the compositions are defined more specifically, the percentages are given by weight which is easier to determine by chemical analysis. In this type of alloy, 1% by volume of $Al_2O_3$ corresponds to about 0.6% by weight of the oxide, which means about 0.3% by weight of oxygen in the alloy.

The oxide formed in the sprayed metal layer consists of a mixture of $Al_2O_3$, $Fe_2O_3$ and $Cr_2O_3$, sometimes in solid solution with each other. The distribution of the oxides in the layer depends on the atomized particles, and the oxide covers the surface of the particles at least in part. In the layer, the oxide exists in the form of extremely fine particles and films which partially envelop the alloy particles. The film thickness of the oxide film is about 0.1 to 0.5 micron or about 2 microns as a maximum, but can vary with different spraying conditions.

For the proper functioning of the alloy during exposure to oxidation at high temperatures, it is important that the oxide films however thin they are do not completely cover the atomized particles and separate them from each other. The diffusion of aluminum atoms, which is an important prerequisite for the oxidation resistance of the alloys, must also not be prevented by such oxide films. It has now been found that by using the spraying method of the present invention it is possible to form layers in which aluminum can diffuse freely from different parts of the layer to the surface, where the aluminum is converted into a protective coating of dense aluminum oxide.

In practical applications according to the present invention, it may be desirable to obtain layers with a thickness of 0.5 to 1 mm. It has been found that the exterior portions of the layers sometimes have higher porosity whereas the interior portions of the layers which have a thickness of about 0.2 to 0.6 mm depending on circumstances, sometimes have a denser structure. The exterior slightly porous layer may therefore be removed, for example, by grinding or in some other way.

In a particularly preferred form of the invention, the wire or wires fed to the flame spray or arc spray guns have diameters of from 1.5 to 3.2 mm and contain from 3–8% aluminum and 9–24% by weight chromium. The preferred oxygen content is less than 0.50% by weight in the deposited alloy and most preferably from 0.01% to 0.05% by weight.

The following specific examples illustrate the method of the present invention and the results achieved.

EXAMPLE 1

A 2.25 mm diameter alloy wire containing 23% by weight chromium, 5% by weight aluminum, and the remainder iron, combined with small amounts of other atoms, was flame sprayed at a rate of 20 meters per minute by means of a "Metco" spray gun, wire nozzle 7A/11, air nozzle J. The fuel gases were acetylene and oxygen. Argon was used as the atomizing gas. Layers of a thickness of 0.85 mm were applied to all sides of cylindrical iron plates. By means of analysis of one layer after spraying, it was found to contain 5.2% by weight Al, 21.8% by weight Cr, 0.018% by weight N, 0.19% by weight O, combined in the form of oxides, and also impurities consisting of small amounts of silicon, manganese, carbon, and the like. The samples were oxidized at a temperature of 1000° to 1300° C. for one week. At the end of the week, the samples showed no sign of surface peeling at a temperature of 1000° C. but did exhibit a slight discoloration due to the formation of a protective layer of oxide. After 2 months at 1000° C., a protective layer of oxide with a thickness of 0.1 mm had been formed. After 6 months the thickness of the oxide layer was 0.3 mm. In the area closest to the iron surface in the coated layer, particles of aluminum nitride (AlN) were observed at 1000° C. after one month, and also in the iron plate where they were obviously formed by diffusion.

EXAMPLE 2

A combustion chamber of Ni-Cr-steel was provided having the shape of a pot with a conical wall including a 45 mm diameter central hole. The outer diameter was 370 mm at the upper edge and 225 mm at the bottom with the central hole. The width of the pot wall was 100 mm.

Following a sand blasting the pot was subjected to spraying by means of a "Mogul" spray apparatus using a thread of 2.25 mm diameter and consisting of an iron-chromium-aluminum alloy using acetylene and oxygen as combustion gases. Air was used as the propelling gas.

The spraying was continued for 90 minutes and the increase in weight was 1.2 kg. This corresponds to a layer of 1.2 g/cm$^2$. As the specific gravity was 6.8, the increase in weight corresponded to a thickness of layer of 1.8 mm.

The layer increased the resistance of the combustion chamber to sulfur-containing gases. The composition of the alloy in the layer was 21.8% by weight Cr, 5.2% by weight Al, 0.017% by weight N, 0.11% by weight O, and the balance being Fe.

Sprayed layers according to the present invention may be utilized in many ways but are of special value in their resistance to sulfuric combustion gases as may occur, for example, in oil burners, soda recovery burners, and the like. The iron-chromium-aluminum layers obtained resist such attacks much better than the nickel bearing high alloy steels and can be less expensive.

The layers can also be used to protect other metals, for example, molybdenum from catastrophic oxidation at temperatures exceeding 600° C.

In accordance with the present invention, it is essential that the oxide films be developed in such a way that the oxide formation is controlled. By means of additional heat treatment such as sintering, the oxide films are able to slow down oxidation and the grain growth in the sprayed layers. At the same time, the films should be such that they do not materially prevent the free diffusion of aluminum atoms in the layer from interior zones of the layer to the superficial outer zones.

The alloy may have zones containing oxides and aluminum nitrides. These may be distributed in such a way that the proportion thereof is higher in the outermost and innermost zones whereas the intervening zones contain less oxide and nitride. When the layers are tested at elevated temperatures in air, it may be observed after different periods of time how the oxide attacks from the outer surface of the layers penetrate progressively deeper but that the attacks are arrested at their passage through zones having evenly distributed oxide and aluminum nitride particles.

The exact mechanism for this delayed or arrested oxidation is not entirely clear but it manifests itself by producing unexpected good properties which characterize the hot sprayed layers according to the present invention.

An examination of sprayed layers according to the invention which have been tested in air at temperatures within the range of 900° to 1300° C. have revealed that the properties, composition and function of the layers vary with a number of variables such as thickness of the layer, feed rate, atomizing gas, flame temperature and nozzle design.

The best protective properties are obtained according to the invention when the layer after spraying is at least 0.3 mm thick.

In practice, at least 0.2 mm of the original sprayed layer is removed. The underlying remaining layer is denser and resists oxidation much better than the superficial portions.

The Fe-Cr-Al-type alloys exhibit a very low heat conductivity. Consequently, they function as heat insulators in which case they contribute to a high temperature resistance by resisting attacks at elevated temperatures better than the base material, and also by lowering the temperature of the base material.

The alloys of the present invention containing iron, chromium, and aluminum may also contain small amounts of other atoms which occur inherently during their manufacture, such as carbon, manganese, and silicon, and they may also include the kind which are intentionally added during manufacture to modify the properties of the alloy such, for example, as yttrium, titanium, hafnium, zirconium, and rare earth metals.

The heat treatment of the sprayed layer may lead to dissolution of the films and redistribution which results in an entirely new structure. This new structure is characterized by the fact that the pores and oxide inclusions are drawn together to provide closed cavities whereas the alloy per se is very dense. A suitable heat treatment consists of sintering for at least one minute at a temperature in the range from 1200° to 1400° C. thereby causing oxide films present to shrink together into closed cavities, and densifying the alloy.

In a particularly preferred form of the invention, the layer deposited has an oxygen content of less than 0.50% by weight, preferably about 0.20% by weight.

It should be evident that various modifications can be made to the described embodiments without departing from the scope of the present invention.

I claim as my invention:

1. A method for producing a metal layer on a substrate which comprises flame spraying an iron, chromium, and aluminum alloy in the form of a wire in a flame spray gun under conditions of mild oxidation to produce a layer consisting essentially of from 10 to 35% by weight chromium, 1 to 12% by weight aluminum, 0.008 to 0.025% by weight nitrogen, 0.01 to 1.25% by weight oxygen predominantly as oxides of aluminum, iron, and chromium, with the balance substantially iron, the oxidation being sufficient to cover the metal particles partially in the form of extremely fine oxide films having thicknesses on the order of 0.1 to 0.5 micron but being sufficiently discontinuous to permit diffusion of aluminum to the surface.

2. A method according to claim 1 in which the spraying is performed using argon as an atomizing gas.

3. A method according to claim 1 in which said alloy contains from 3 to 8% aluminum, 9 to 24% chromium, and the balance being essentially iron.

4. A method according to claim 1 in which said layer is deposited to a thickness of at least 0.3 mm and said layer subsequent to spraying is machined to remove at least 0.2 mm of its previous thickness.

5. A method according to claim 4 in which the layer after machining is heat treated for at least one minute at a temperature in the range from 1200° to 1400° C. to sinter the alloy layer, causing oxide films present to shrink together and into closed cavities, and to densify the alloy.

* * * * *